United States Patent [19] [11] 4,281,194
Armor et al. [45] Jul. 28, 1981

[54] PROCESS FOR AMMOXIMATION OF CYCLOHEXANONE

[75] Inventors: John N. Armor, Morris Plains; Emery J. Carlson, Chatham, both of N.J.

[73] Assignee: Allied Chemical Corporation, Morris Township, Morris County, N.J.

[21] Appl. No.: 125,723

[22] Filed: Feb. 28, 1980

[51] Int. Cl.[3] .......... C07C 131/04
[52] U.S. Cl. .......... 564/267; 252/453
[58] Field of Search .......... 260/566 A; 564/259, 564/265, 267, 278; 252/453

[56] References Cited

U.S. PATENT DOCUMENTS 4,163,756 8/1979 Armor .......... 260/566 A

*Primary Examiner*—Natalie Trousof
*Assistant Examiner*—L. Hendriksen
*Attorney, Agent, or Firm*—Alan M. Doernberg; Robert A. Harman

[57] ABSTRACT

An amorphous silica/alumina gel catalyst obtained by coprecipitating orthosilicate tetraester and aluminate triester in about 2.5:1 mole ratio, via rapid addition of about 0.4 to 5 moles of water per molecular equivalent of total ester groups, and drying at not over about 275° C. is an effective catalyst for vapor phase reaction of cyclohexanone, ammonia and oxygen to form cyclohexanone oxime. This oxime can be rearranged to caprolactam, the starting material for nylon-6.

5 Claims, No Drawings

PROCESS FOR AMMOXIMATION OF CYCLOHEXANONE

DESCRIPTION

BACKGROUND OF THE INVENTION

It is known from U.S. Pat. No. 4,163,756 of Aug. 7, 1979 to J. N. Armor that cyclohexanone can be converted to its oxime by use of ammonia and oxygen in gas phase in contact with a solid catalyst, preferably a silica gel catalyst, at temperatures in the range of 50° to 500° C.

SUMMARY OF THE INVENTION

This invention relates to an improved such process for producing cyclohexanone oxime using ammonia and oxygen, hereinafter sometimes referred to as "ammoximation". In the present process, a catalyst is provided which is capable of producing the cyclohexanone oxime with higher selectivity and higher yield than previously obtained and with a longer catalyst lifetime.

The catalyst of this invention is an essentially amorphous silica/alumina gel, obtained by forming a nearly clear liquid solution consisting essentially of an orthosilicate tetraester and aluminate triester in mole ratio of about 2:1-3:1 of said silicate:said aluminate; hydrolyzing said esters, thereby coprecipitating silica and alumina in the form of a gel, by adding to the ester solution, under agitation, a quantity of water amounting to about 0.4 to 5 moles of water per molecular equivalent of total ester groups, at a rate of addition which equals or exceeds the rate at which gelation of the liquid commences. After the rapid addition of water in the above quantities, rapid gelation of the body of liquid to a body of gel occurs with evolution of heat. Heating or cooling the gel-forming reaction mixture does not substantially affect the selectivity obtained using the resulting gel catalyst for oxime production.

Presence of some ammonia in the water has sometimes appeared to raise the selectivity of the catalyst somewhat.

The use of too little or too much water results in lower selectivity of the catalyst for oxime production; and heating the solution before gelation appears to reduce the selectivity of the catalyst.

The wet gel is subjected to heating at temperatures preferably not over about 275° C. in air to evaporate out the byproducts of hydrolysis, namely alcohols produced from the ester starting materials. The resulting dried gel characteristically has bulk density of about 0.3 to 0.4 g/cc, surface area (as measured by the usual methods using nitrogen gas) of between 120 to 500 sq.m/g and average pore diameter (measured by Hg porosimetry) of about 10 to 20 nm.

DETAILED DESCRIPTION

The esters preferably used as starting materials are $C_1$-$C_4$ alkyl esters namely methyl, ethyl, propyl and butyl.

Optimum selectivity of the catalyst for the desired production of cyclohexanone oxime is obtained at silicate ester:aluminate ester mole ratio of $2.5\pm0.2$:1.

The gelation is very rapid, typically being essentially complete within about one minute after the addition of water is completed.

Drying overnight at higher temperatures than about 275° C. tends to decrease the selectivity of the catalyst for oxime production but heating for relatively short periods as high as 700° C. has no detrimental effect.

The example which follows is illustrative of our invention and of the best mode presently contemplated by us for carrying out the invention but is not intended as limiting.

A. Preparation of Catalyst

Tetramethyl orthosilicate (liquid, 3.0 g) and aluminum sec-butoxide (viscous liquid, 1.95-2.0 g) were mixed. Some local gelation occurred during mixing, after which the mixture reverted to a nearly clear liquid. (If at this point allowed to stand for one hour or longer, the mixture becomes opaque).

With stirring, about 0.75-2.00 mL (typically 1.25 mL) of water was added all at once to the nearly clear liquid. Some temporary local gelation was observed and after a few seconds the mixture again became practically clear as stirring was continued. Within 10 to 60 seconds the body of liquid suddenly set to a body of wet gel.

The gel was allowed to stand to ensure completion of the hydrolysis of the esters, then was dried at temperatures rising from 60° C. to 200° C. to evaporate out the byproduct alcohols (methanol and butanol). When progressively higher temperatures above about 275° C. were used for drying, a progressive decline in selectivity of the catalyst for oxime production was noted.

The product was a white granular solid weighing about 1.8 g (theoretical for a bone dry silica/alumina composition from the given starting materials is 1.58 g). The surface area was measured as about 450 sq.m/g and the average pore diameter was measured as about 15 nm. The product was indicated to be amorphous by X-ray analysis. The percent of carbon in the product was less than 2 percent by weight. The bulk density was about 0.35 g/cc.

B. Ammoximation Using Catalyst of Part A

The apparatus was as described in U.S. Pat. No. 4,163,756 (above cited) in column 3, lines 2-24. Using 1 mL of the above catalyst and temperture of 225° C. and a gaseous mixture of (by volume) 50 percent $NH_3$, 15 percent $O_2$ and 1.8 percent cyclohexanone vapor, and total gaseous flow rate of about 21 mL per minute, a selectivity of producing cyclohexanone oxime of 60 to 71 percent was observed during about 10 hours of operation at conversion of cyclohexanone of about 60 percent; i.e. the yield of oxime based on cyclohexanone starting material was about 35-42 percent of theory during this period. Thereafter the catalyst activity dropped rapidly.

When a temperature of 215° C. and otherwise the same conditions as just stated were employed the selectivity fell a few percent lower (maximum of 66%); the catalyst showed longer life than in the runs at 225° C.

When the scale of catalyst preparation per Part A was increased 8-fold, a selectivity peak of 66% was observed under conditions similar to those of Part B above.

Inert gases can be present in the ammoximation reaction mixture, e.g. nitrogen when the oxygen is supplied as air.

At least to some extent, the orthosilicate and aluminate ingredients of the catalyst can be replaced by fumed (pyrogenic) silica and alumina, respectively; however such replacement in too large proportions results in lowered catalyst selectivity. Moreover magnesium dialkoxide can replace a certain proportion of the aluminate ingredient; for example a catalyst from tetramethyl orthosilicate/aluminum sec-butoxide/magnesium diethoxide in mole ratio of 2.5:0.8:0.2 showed selectivity, under conditions similar to those of Part B above, of 66%.

We claim:

1. In a process of direct conversion to oxime of a mixture of cyclohexanone, ammonia and oxygen in contact with a solid catalyst at temperature in the range of 50° to 500° C., the improvement which comprises employing as catalyst a silica/alumina amorphous gel, obtained by forming a nearly clear liquid solution consisting essentially of an orthosilicate tetraester and an aluminate triester in mole ratio of about 2:1–3:1 of said silicate:said aluminate; hydrolyzing said esters, thereby coprecipitating silica and alumina in the form of a gel, by adding to the ester solution, under agitation, a quantity of water amounting to about 0.4 to 5 moles of water per molecular equivalent of total ester groups, at a rate of addition which equals or exceeds the rate at which gelation of the liquid commences, whereafter rapid gelation of the body of liquid to a body of gel occurs with evolution of heat; and evaporating out of the gel at temperatures not over about 275° C. the by-products of hydrolysis thereby producing dried gel of bulk density about 0.3 to 0.4 g/cc.

2. Process of claim 1 wherein said esters are $C_1$–$C_4$ alkyl esters.

3. Process of claim 1 wherein said rapid gelation is essentially complete within about one minute after the addition of water is completed.

4. Process of claim 3 wherein said orthosilicate is the tetramethyl ester and said aluminate is the tri(sec-)butyl ester; and the dried gel has surface area of about 120 to 500 sq.m/g and average pore diameter of about 10 to 20 nm.

5. Process of claim 4 wherein the mole ratio used of silicate ester:aluminate ester is 2.5±0.2:1.

* * * * *